US011105423B2

(12) United States Patent
Aoki et al.

(10) Patent No.: US 11,105,423 B2
(45) Date of Patent: Aug. 31, 2021

(54) MECHANICAL SEALING DEVICE

(71) Applicants: SHIMADZU CORPORATION, Kyoto (JP); EAGLE INDUSTRY CO., LTD., Tokyo (JP)

(72) Inventors: Kengo Aoki, Kyoto (JP); Hiroki Honda, Kyoto (JP); Hidekazu Takahashi, Tsurugashima (JP)

(73) Assignees: SHIMADZU CORPORATION, Kyoto (JP); EAGLE INDUSTRY CO., LTD., Tokyo (JP)

( * ) Notice: Subject to any disclaimer, the term of this patent is extended or adjusted under 35 U.S.C. 154(b) by 144 days.

(21) Appl. No.: 16/470,305

(22) PCT Filed: Dec. 11, 2017

(86) PCT No.: PCT/JP2017/044318
§ 371 (c)(1),
(2) Date: Jun. 17, 2019

(87) PCT Pub. No.: WO2018/116880
PCT Pub. Date: Jun. 28, 2018

(65) Prior Publication Data
US 2020/0096113 A1    Mar. 26, 2020

(30) Foreign Application Priority Data
Dec. 22, 2016    (JP) ............................. JP2016-248582

(51) Int. Cl.
*F16J 15/36*    (2006.01)
(52) U.S. Cl.
CPC ..................... *F16J 15/36* (2013.01)
(58) Field of Classification Search
CPC .. F16J 15/36; F16J 15/363; F16J 15/34; F16J 15/342; F16J 15/3436; F16J 15/3464;
(Continued)

(56) References Cited

U.S. PATENT DOCUMENTS 2,038,855 A    4/1936  Rosenblad
3,002,769 A *  10/1961 Deubler ................ F16L 27/093
                                                        285/39

(Continued)

FOREIGN PATENT DOCUMENTS

DE        2544414 A1    4/1977
EP    1 724 502 A2     11/2006
(Continued)

OTHER PUBLICATIONS

Third Party Observation for PCT/JP2017/044318 dated Sep. 13, 2018.
(Continued)

*Primary Examiner* — Nathan Cumar
(74) *Attorney, Agent, or Firm* — Sughrue Mion, PLLC

(57) ABSTRACT

A mechanical sealing device according to an embodiment of the present invention includes: a sealing ring (13) attached to a protrusion (11a) protruding from a housing (11); a mating ring (23) attached to an end portion of a rotary shaft (21); a welded bellows provided around the protrusion (11a) and located between the housing (11) and the sealing ring (13). The welded bellows (15) presses the sealing ring (13) in an axial direction to cause the sealing ring (13) to be in contact with the mating ring (23), thereby ensuring high pressure force, and in particular, uniform pressure force along its entire circumference, so as to achieve high liquid tightness, while maintaining the sizes in axial and radial directions small. Furthermore, the welded bellows (15) works as a sealing member of blocking a liquid leaked out through the O-ring (14), thereby achieving assured liquid tightness. Accordingly, an outside-type mechanical sealing device can be provided which has a compact size, and is capable of ensuring high liquid tightness in response to a high rotation speed and a high liquid pressure.

2 Claims, 2 Drawing Sheets

(58) Field of Classification Search
CPC ........ F16J 15/344; F16J 15/3268; F16J 15/16; F16J 15/50; F16J 15/52; F16J 3/04; F16J 3/047
USPC .......................................................... 277/379
See application file for complete search history.

(56) References Cited

U.S. PATENT DOCUMENTS

| | | | | |
|---|---|---|---|---|
| 4,502,699 | A * | 3/1985 | Mukerji | B04B 5/0442 277/398 |
| 2013/0284959 | A1* | 10/2013 | Hochgraeber | F16K 25/005 251/129.11 |
| 2015/0226335 | A1* | 8/2015 | Takahashi | F16J 15/348 277/393 |

FOREIGN PATENT DOCUMENTS

| | | |
|---|---|---|
| EP | 2 708 886 A2 | 3/2014 |
| JP | 2008-025597 A | 2/2008 |
| WO | 2012/095097 A1 | 7/2012 |

OTHER PUBLICATIONS

International Search Report for PCT/JP2017/044318 dated Mar. 6, 2018 [PCT/ISA/210].
Written Opinion for PCT/JP2017/044318 dated Mar. 6, 2018 [PCT/ISA/237].
Extended European Search Report dated Feb. 7, 2020, from the European Patent Office in Application No. 17885411.3.

* cited by examiner

MECHANICAL SEALING DEVICE

CROSS REFERENCE TO RELATED APPLICATIONS

This application is a National Stage of International Application No. PCT/JP2017/044318 filed Dec. 11, 2017, claiming priority based on Japanese Patent Application No. 2016-248582 filed Dec. 22, 2016.

TECHNICAL FIELD

The present invention relates to a mechanical sealing device, and more specifically relates to an outside-type mechanical sealing device to be used in a rotary joint and so on.

BACKGROUND ART

When a fluid (liquid) is conveyed, in various industrial devices and machines, from a pipe in a fixed state (hereinafter, referred to as "fixed-side pipe") to a pipe provided in a rotation body (hereinafter, referred to as "rotation-side pipe"), or in the reverse direction, a device called a rotary joint is usually used. A typical rotary joint includes a housing part at which the end face of the fixed-side pipe opens, a rotary shaft at which the end face of the rotation-side pipe opens, and a mechanical sealing device provided between the housing part and the rotary shaft for preventing the fluid from leaking out of a minute gap between openings at the respective end faces of both pipes (see Patent Literature 1, and other documents).

Mechanical sealing devices include the inside type and the outside type. The mechanical sealing device used in the rotary joint is the outside-type. Unless otherwise noted, the outside-type mechanical sealing device is simply referred to as the mechanical sealing device, hereinafter.

The mechanical sealing device typically includes: a mating ring (rotation ring) that rotates with the rotary shaft; a sealing ring (fixed ring) provided in the fixed side; a spring mechanism that urges and presses the sealing ring toward the mating ring; and secondary seals that respectively seal a space between the mating ring and the rotary shaft, as well as a space between the sealing ring and the housing. The spring mechanism presses the sealing ring toward the mating ring, so that both rings come into contact with each other. When the mating ring rotates along with the rotation of the rotary shaft, the contact faces of the sealing ring and the mating ring serves as sliding faces. The sliding faces function as the primary seal that prevents the fluid from leaking out. The primary seal or the sliding faces prevents a fluid from leaking out, causing the fluid to enter a gap between the mating ring and the rotary shaft (dead volume), for example. The secondary seals prevent such a fluid from leaking out.

In recent years, higher performance has been demanded for various devices using the rotary joint. With such demand, the mechanical sealing device available at a higher rotation speed is required. In particular, a device that deals with a liquid is required to have high liquid tightness (seal tightness) against a higher liquid pressure, for increasing the flow rate of the liquid flowing through pipes. On the other hand, the devices are also required to have their sizes reduced. As such, the mechanical sealing devices are also required to be made smaller. However, the smaller size often opposes the demand to the high rotation speed or the high liquid pressure, in the mechanical sealing device.

The specific description is as follows. In the outside-type mechanical sealing device, unlike the inside-type mechanical sealing device, centrifugal force acts on the liquid that is leaking out. Accordingly, if the rotation speed is increased, the liquid pressure on the sliding faces (sealing interface) increases. If the rotation speed is increased in addition to the increase in the flow rate of the liquid, the liquid pressure on the sliding faces significantly increases, causing the seal tightness to be lowered. The force of the spring mechanism that presses the sealing ring may be increased for enhancing the seal tightness. However, if the length of the spring in the axial direction is increased for increasing the pressing force, it becomes difficult to reduce the size of the mechanical sealing device in the axial direction. The number of springs may be increased for increasing the pressing force instead of increasing the length of the spring in the axial direction. However, the increase in the number of springs requires the springs to be mounted at a position away from the center of the rotary shaft toward the outer peripheral side. This makes it difficult to reduce the size of the mechanical sealing device in the radial direction. It is further possible to increase the pressing force by increasing the size of the spring in the radial direction. In this case, however, it is also difficult to reduce the size of the mechanical sealing device in the radial direction.

CITATION LIST

Patent Literature

Patent Literature 1: JP 2008-25597 A

SUMMARY OF INVENTION

Technical Problem

The present invention has been developed to solve the above problems, and aims to provide an outside-type mechanical sealing device that can reduce its size in both the axial and radial directions with ensuring high seal tightness against the increase in liquid pressure due to the increase in rotation speed, the increase in the amount of liquid to be flown, and so on.

Solution to Problem

The present invention developed for solving the previously described problem is a mechanical sealing device provided between a housing and a rotary shaft for preventing a liquid from leaking out from a connection portion of a first passage and a second passage when a liquid is supplied from the first passage to the second passage or in the reverse direction, wherein the housing has a protrusion protruding in a substantially columnar shape and the first passage is formed inside the protrusion in the axial direction of the protrusion, and wherein the second passage is formed inside the rotary shaft to extend in the axial direction along which the first passage extends, the mechanical sealing device including:

a) a fixed-side annular portion unrotatably and slidably in the axial direction attached to the housing, the fixed-side annular portion being sealed to the protrusion of the housing with a fixed-side sealing member;

b) a rotation-side annular portion attached to the rotary shaft so as to be integrally rotatable with the rotary shaft, the rotation-side annular portion being sealed to the rotary shaft with a rotation-side sealing member; and c) a bellows provided around the protrusion so as to be positioned between the housing and the fixed-side annular portion, for pressing the fixed-side annular portion toward the rotation-side annular portion to cause the fixed-side annular portion to be in contact with the rotation-side annular portion.

In typical mechanical sealing devices, a bellows is often used as a sealing member. However, in the mechanical sealing device according to the present invention, the bellows is used as an elastic member that presses the sealing ring, i.e., the fixed-side annular portion, not as a sealing member. In known and typical outside-type mechanical sealing devices, a spring has been used as the elastic member that exerts the pressing force to the fixed-side annular portion. However, in the mechanical sealing device according to the present invention, the bellows is used instead of the spring. Specifically, a bellows with a hollow part is used in which the diameter of the hollow part is slightly larger than the outer diameter of the substantially columnar-shaped protrusion of the housing. The bellows is provided around the protrusion, i.e. the protrusion is inserted in the hollow part of the bellows, and then the fixed-side annular portion is attached to the protrusion via the fixed-side sealing member. It should be noted that an O-ring or other sealing devices may be used as the fixed-side sealing member.

The fixed-side annular portion is pressed by the pressing force of the bellows so as to be firmly contacting, along its entire circumference, to the rotation-side annular portion. With this configuration, the seal tightness is ensured between the fixed-side annular portion and the rotation-side annular portion. The liquid may be supplied from the outside to the first passage and flow from the first passage to the second passage, for example. Here, there is a minute gap between the end portion of the first passage and the end portion of the second passage, which is provided opposite to the end portion of the first passage. The liquid that leaks out of the minute gap tends to spread peripherally. Even in a such a case, the rotation-side annular portion that rotates with the rotary shaft and the fixed-side annular portion that is in the stationary state are satisfactorily sealed by the aforementioned firmly-contacting faces (sliding faces), thereby containing the spread of the liquid inside the contacting faces. There are gaps respectively between the fixed-side annular portion and the projection, as well as between the rotation-side annular portion and the rotary shaft. Although the contained liquid tends to leak through each of these gaps as mentioned above, the gaps are also sealed by the fixed-side sealing member and the rotation-side sealing member, respectively. Thus, the liquid never leaks out to the outside through these sealing members. Therefore, according to the mechanical sealing device relating to the present invention, the leakage of the liquid to the outside can be prevented when the liquid flows from the first passage to the second passage, or flows in the reverse direction.

The bellows used in the mechanical sealing device according to the present invention exerts the pressing force in the axial direction over its entire periphery in the circumferential direction, unlike a spring. In addition, the pressing force is approximately uniform in the periphery. Accordingly, owing to a single bellows, the fixed-side annular portion is roughly uniformly pressed in the axial direction over its entire periphery, and is firmly contacting to the rotation-side annular portion. Thus, the pressing force in the circumferential direction is impartial, thereby obtaining the seal tightness approximately uniform in the circumferential direction. Furthermore, the bellows can provide the high pressing force while preventing increase in the length in the axial direction and the size in the radial direction, in comparison with the spring. The bellows is fixed to the housing so that the projection is inserted in the bellows. Accordingly, there is no need to provide a concave portion for holding the end portion of the spring as in the conventional configuration in which a plurality of springs are used, for example. Even in this regard, the bellows according to the present invention is preferable for reducing the size of the mechanical sealing device in the axial direction.

In the mechanical sealing according to the present invention, it is preferable that the fixed-side sealing member between the fixed-side annular portion and the protrusion is disposed between a contact portion of the bellows with the housing and a connection portion of the first passage with the second passage.

In the aforementioned preferable configuration, the bellows that itself has the seal tightness, unlike the spring, is located at the position outer (atmosphere side) than the position of the fixed-side sealing member. Accordingly, if the liquid leaks out to the atmosphere side through the contact faces of the fixed-side annular portion and the rotation-side annular portion, i.e., the sliding faces, the liquid is for the most part blocked by the bellows and hardly reach the fixed-side sealing member. If the liquid is a crystalline fluid, crystals may be deposited on the fixed-side sealing member, such as an O-ring. This causes the crystal to stick in the sealing interface, which lowers the liquid tightness. On the other hand, in the aforementioned configuration, it is difficult for the liquid entering the mechanical sealing device to reach the fixed-side sealing member, thereby preventing such liquid tightness from reducing.

The fixed-side annular portion pressed by the bellows slightly moves in the axial direction. Thus the fixed-side sealing member provided between the fixed-side annular portion and the projection receives a larger force compared with the rotation-side sealing member provided between the rotation-side annular portion and the rotary shaft. This causes the fixed-side sealing member provided between the fixed-side annular portion and the projection to easily deteriorate. According to the aforementioned preferable configuration, even if the liquid leaks out through the fixed-side sealing member, the liquid is blocked by the bellows, and is prevented from leaking to the outside. In other words, the liquid is blocked in two steps, i.e., the fixed-side sealing member and the bellows, in the fixed-side (housing side). Therefore, the leakage of the liquid to the outside can be surely prevented.

In order to enhance the above effects, a sealing member may be provided between the bellows and the housing, and between the bellows and the fixed-side annular portion, respectively. Alternatively, the bellows and the housing, as well as the bellows and the fixed-side annular portion may be bonded by an adhesive, or the like.

The bellows roughly includes a unitary type and a welded type. In the present invention, the welded type bellows is preferable, which is produced by alternately, in the axial direction, welding the inner peripheral edges and the outer peripheral edges of a plurality of donut shaped thin metal plates. This is because a large pressing force can be obtained by such a welded-type bellows even with a short length in the axial direction, in comparison with the unitary-type bellows. The fixed-side annular portion and the rotation-side annular portion may be made of SiC.

Advantageous Effects of Invention

According to a mechanical sealing device relating to the present invention, the device can be made smaller with ensuring the high seal tightness between a rotary shaft and a fixed housing. With this configuration, even if the liquid pressure applied to a sliding faces increases by increasing the rotation speed of the rotary shaft or increasing the flow rate of the liquid to be supplied to a flow passage, the liquid can be prevented from leaking out through the sliding faces.

DESCRIPTION OF EMBODIMENTS

Figure 1:
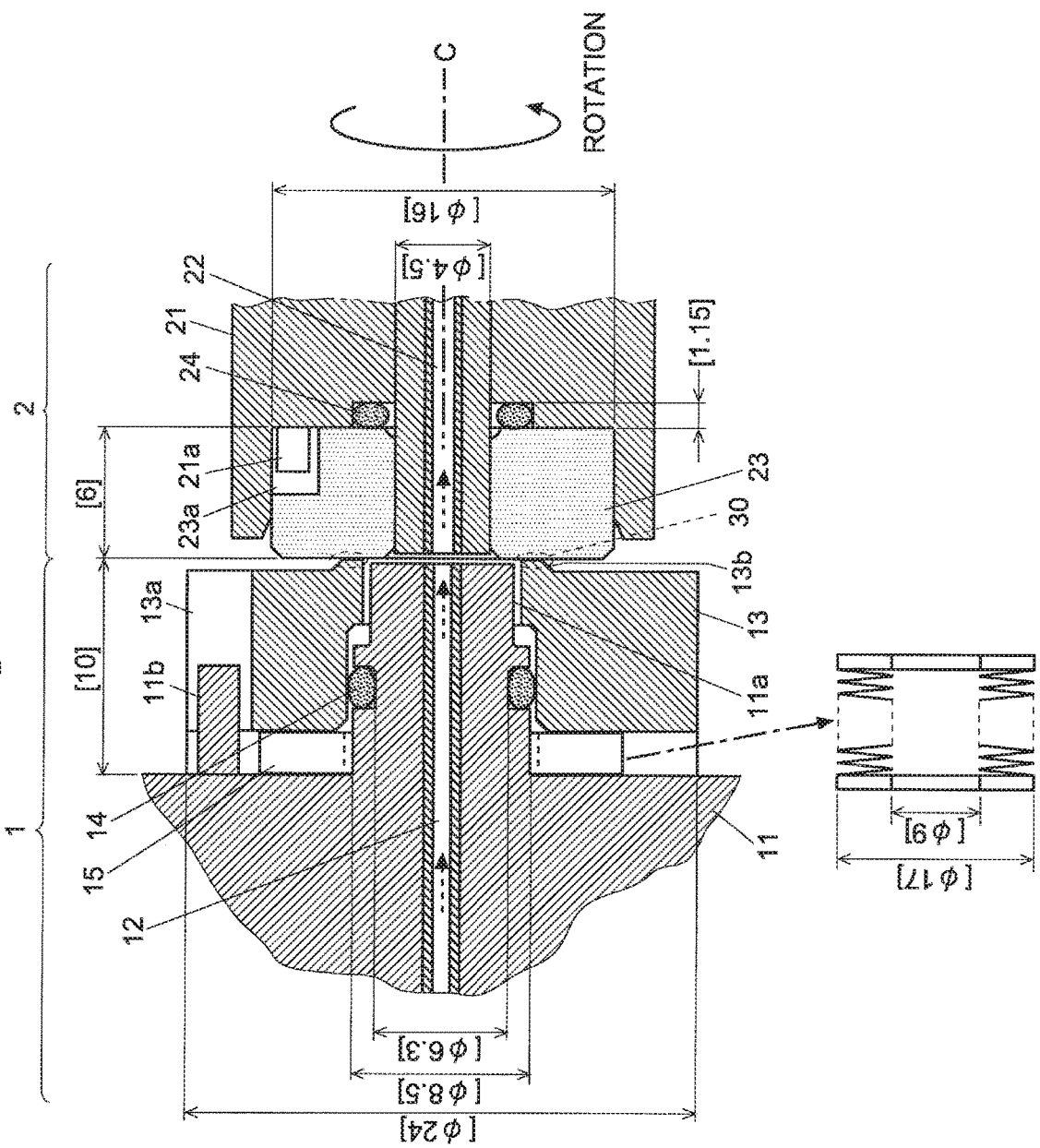
FIG. 1 is a schematic cross sectional view of a flow-passage connection part, in which a mechanical sealing device according to an embodiment of the present invention is included.
Figure 2:
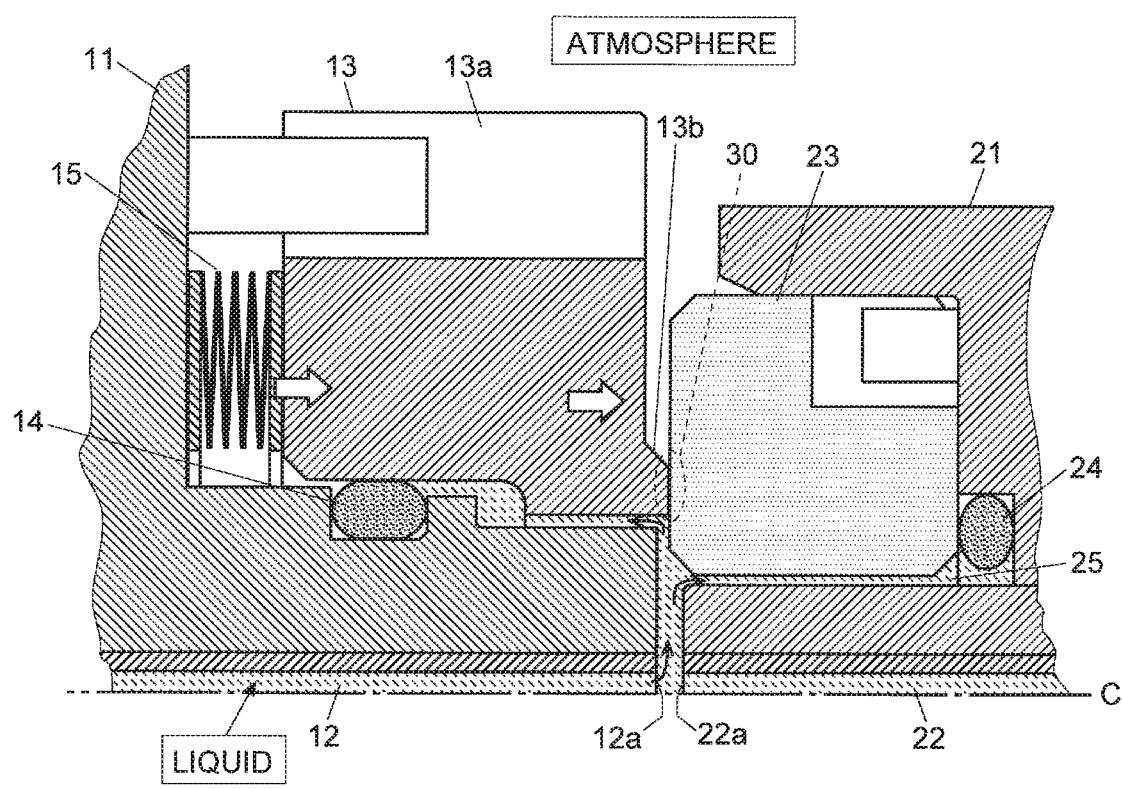
FIG. 2 is an enlarged diagram of a part of the flow-passage connection part shown in FIG. 1.

The mechanical sealing device according to an embodiment of the present invention is described with reference to the attached drawings. FIG. 1 is a schematic cross sectional view of a flow-passage connection part, in which the mechanical sealing device according to the embodiment of the present invention is included. FIG. 2 is an enlarged diagram of the upside part of the flow-passage connection part, above an axial C shown in FIG. 1. It should be noted that FIG. 1 includes reference signs indicating the respective parts, and sizes of the main parts (unit: mm) in brackets.

The mechanical sealing device according the present embodiment is, for example, provided between a passage in a fixed-side and a passage in a rotation-side that rotates relative to the fixed, and used for a connection through which a liquid is supplied from one passage to the other passage. In other words, in FIG. 1, a rotation part 2 rotates relative to a fixed part 1 around an axis C by a rotation driving mechanism (not shown).

The fixed part 1 includes a metallic housing 11 made of, for example, stainless steel. The housing 11 has a protrusion 11a protruding in a substantially columnar shape. Inside the protrusion 11a, a fixed-side passage (corresponding to a first passage in the present invention) 12 is formed so as to extend in the axial direction. The fixed-side passage 12 has one end that is an opening (12a) at the substantially circular-shaped end face of the end of the protrusion 11a. The rotation part 2 includes a rotary shaft 21 having a substantially columnar shape. Inside the rotary shaft 21, a rotation-side passage (corresponding to a second passage in the present invention) 22 is formed so as to extend in the axial direction of the rotary shaft 21. The rotation center of the rotary shaft body 21 coincides with the central axis of the rotation-side passage 22. The rotation-side passage 22 has one end that is an opening (22a) at the substantially circular-shaped end face of the end of the rotary shaft 21.

The rotary shaft 21 is held by a holding mechanism (not shown) in a manner of being rotatable relative to the housing 11 so that the substantially circular-shaped end face of the end of the rotary shaft 21 and the substantially circular-shaped end face of the end of the protrusion 11a face each other in an approximately parallel fashion. Accordingly, the opening 12a of the fixed-side passage 12 and the opening 22a of the rotation-side passage 22 face each other with a minute gap between them. The openings 12a and 22a have the same diameter, and are used in supplying a liquid from the fixed-side passage 12 to the rotation-side passage 22, as shown in FIG. 1 with the dotted arrow, or in the reverse direction i.e., from the rotation-side passage 22 to the fixed-side passage 12. When a liquid is supplied, the mechanical sealing device according to the present embodiment functions to prevent the liquid that leaks out from the gap between the openings 12a and 22a from leaking toward the surroundings, i.e., an atmosphere side.

The mechanical sealing device includes: a substantially annular-shaped sealing ring (corresponding to the fixed-side annular portion in the present invention) that is loosely fitted in the outer periphery of the protrusion 11a in the side of the fixed part 1; an annular shaped O-ring (corresponding to the fixed-side sealing member in the present invention) provided between the inner peripheral surface of a center-side opening of the sealing ring 13 and the outer peripheral surface of the protrusion 11a; a substantially annular-shaped welded bellows 15 provided between the sealing ring 13 and the housing 11; a substantially annular-shaped mating ring (corresponding to the rotation-side annular portion in the present invention) 23 fitted in the outer periphery of the end portion of the rotary shaft 21; and an annular-shaped O-ring (corresponding to the rotation-side sealing member in the present invention) 24 provided between the mating ring 23 and the outer periphery of the end portion of the rotary shaft 21.

The protrusion 11a has: the proximal end, the outer diameter of which is $\varphi 8.5$ mm; and an O-ring mounting portion, the outer diameter of which is $\varphi 6.3$ mm. The rotary shaft 21 has: the end portion, the outer diameter of which is $\varphi 4.4$ mm; and an O-ring mounting portion, the length of which in the axial direction (the depth of the concave portion) is 1.15 mm. In addition, the outer diameter of the sealing ring 13 is $\varphi 24$ mm, and the outer diameter of the mating ring 23 is $\varphi 16$ mm.

The sealing ring 13 has, at a part of its outer peripheral surface, an engaging groove 13a that is concaved toward the inner peripheral side. An engaging pin 11b protruding from the housing 11 is engaged with the engaging groove 13a, thereby holding the sealing ring 13 movably in the axial direction relative to the housing 11. The mating ring 23 has, at a part of its outer peripheral surface, an engaging groove 23a that is concaved toward the inner peripheral side, like the sealing ring 13. The engaging pin 21a protruding from the rotary shaft 21 is engaged with the engaging groove 23a, thereby fixing the mating ring 23 to the rotary shaft 21. Accordingly, the mating ring 23 rotates with the rotary shaft 21. The sealing ring 13 and the mating ring 23 may be made of SiC, for example. In particular, the sealing ring 13 may be made of SiC prepared by a special converting method, since high rigidity is required for the sealing ring 13.

The sealing ring 13 is pressed by the welded bellows 15 in the axial direction, i.e., in the right direction in FIGS. 1 and 2, to cause an annular-shaped seal lip 13b protruding in the axial direction from one of the faces of the sealing ring 13 to come into contact with the mating ring 23. The substantially annular-shaped face at which the seal lip 13b and the mating ring 23 come into contact with each other serves as a sliding face 30 when the rotary shaft 21 rotates. At this time, the distance in the axial direction between the sliding faces and the surface at the proximal end of the protrusion 11a of the housing 11 (i.e., an engaging surface with which one end of the welded bellows 15 is engaged) is 10 mm. The distance in the axial direction between the sliding surface and an engaging surface of the mating ring 23 is 6 mm (here, the distance in the axial direction between the surface of the proximal end of the protrusion 11a of the housing 11 and the engaging surface of the mating ring 23 is 16 mm).

The well-known and typical mechanical sealing device having such configuration has usually used a plurality of springs as an elastic member that presses the sealing ring 13.

In contrast, the mechanical sealing device according to the present embodiment uses, instead of the plurality of springs, a single welded bellows 15 formed in a bellows form by alternately welding the inner circles and the outer circles of extremely thin metal plates having a substantially donut shape, in the axial direction. The welded bellows 15 has the inner circles the diameter of which is φ9 mm, and the outer circles the diameter of which is φ17 mm. In other words, the outer diameter of a hollow portion in the substantially columnar shape of the welded bellows 15 is φ9 mm that is slightly larger than the outer diameter of the proximal end of the protrusion 11a, which is φ8.5 mm. Accordingly, the welded bellows 15 is held by being inserted to the innermost position of the protrusion 11a.

In welded bellows 15, adjacent metal plates are welded with each other at the entire periphery of each of the metal plates in the axial direction, so as to have the pressure force in the axial direction in a substantially uniform manner in the circumferential direction. Thus, the sealing ring 13 is pressed in the axial direction at any position in its circumferential direction with the substantially same force, thereby allowing the seal lip 13b to favorably come into contact with the mating ring 23 in its entire circumference. With this configuration, high liquid tightness is achieved at the contact surface of the seal lip 13b and the mating ring 23, i.e., the sliding surface. In addition, even if the total length of the welded bellows 15 is reduced, high pressure force can be ensured. Accordingly, in the present embodiment, sufficient pressing force can be obtained by using the welded bellows 15 having the total length of 2.9 mm. It should be noted that the spring constant of the welded bellows 15 is 1.45.

When the rotary shaft 21 is rotated at a predetermined rotation speed while the liquid is supplied from the fixed-side passage 12 to the rotation-side passage 22, the liquid leaks to the outside of the passage from a gap between the opening 12a of the fixed-side passage 12 and the opening 22a of the rotation-side passage 22, as shown in FIG. 2. The liquid pressure of the liquid supplied to the passages 12 and 22, and the centrifugal force due to the rotation are applied to the liquid that is leaking out. Here, the contact surface (sliding surface) between the seal lip 13b of the sealing ring 13 and the mating ring 23 exhibits high liquid tightness, and thus the liquid barely leaks out toward the atmosphere side through the contact surface. On the other hand, there is a minute gap between the sealing ring 13 and the protrusion 11a, thereby allowing the liquid to enter the gap. Meanwhile, the liquid tightness is not perfectly achieved between the mating ring 23 and the end of the rotary shaft 21. Thus, a small amount of the liquid enters the gap. However, these liquids are almost certainly respectively blocked by the O-rings 14 and 24.

Furthermore, the welded bellows 15 is disposed between the sealing ring 13 and the housing 11. The welded bellows 15 has a bellows part formed by thin metal plates that are integrally welded. The end portion of the welded bellows 15 and housing 11 are highly firmly attached to each other, as well as the end portion of the welded bellows 15 and the sealing ring 13 are also highly firmly attached to each other. Thus, it is difficult for the liquid to flow from the inner peripheral side to the outer peripheral side of the bellows 15, or in the reverse direction, i.e., from the outer peripheral side to the inner peripheral side. Accordingly, even if the O-ring 14 deteriorates to cause a liquid to leak out, the liquid is blocked by the welded bellows 15 located at a position closer to the atmosphere side than the position the O-ring 14 is located. Thus, the liquid does not leak out to the atmosphere side. If the sealing ring 13 that always receives the force from the welded bellows 15 moves in the axial direction, the force is also applied to the O-ring 14 that is in contact with the sealing ring 13. This causes the O-ring 14 in the fixed part 1 to easily deteriorate in comparison with the O-ring 24 in the rotation part 2. However, in the fixed part 1, the welded bellows 15 is further disposed outside the O-ring 14, as a sealing means, thereby surely preventing the liquid from leaking out.

Even if the liquid leaks out to the atmosphere side from the contact surface of the seal lip 13b of the sealing ring 13 and the mating ring 23, and flows along the outer peripheral surface of the sealing ring 13, the liquid is blocked by the welded bellows 15 and is difficult to reach the O-ring 14. If the liquid is a crystalline fluid, a crystal may be deposited in the O-ring 14 after the liquid entering from the atmosphere side reaches the O-ring 14. This may be a large factor of reducing the liquid tightness of the O-ring 14. However, the deposition of the crystal at the O-ring 14 can be prevented by preventing the liquid from entering into a position where the O-ring 14 is placed, as mentioned above.

In general, a sufficient amount of adhesiveness can be ensured between the welded bellows 15 and the sealing ring 13, as well as between the welded bellows 15 and the housing 11 without performing bonding through adhesion or other means. Here, the liquid tightness may be enhanced by performing bonding using an adhesion or other means.

The present inventor experimentally prepared a mechanical sealing device having the size shown in FIG. 1, and performed an experiment under the conditions indicated below, for verifying the effect obtained by the mechanical sealing device according to the present embodiment.

[Conditions for Experiment]
    Types of liquid: Water and surfactant
    Flow rate: 1.65 mL/min
    Pressure: 3 MPa
    Temperature: Room temperature (normal temperature)
    Rotation speed: 8000 rpm
    Operating time: About 20 minutes
    Cooling: Not conducted (only heat radiation by a liquid flowing in the passage)

[Result of Experiment]
    Leakage amount: No leakage was observed by visual inspection. No adhesion of liquid droplets to a scattering-prevention cover provided to surround the device was observed.
    The state of the sliding surface after the experiment: Extremely satisfactory (uniform contact was observed: no coarse surface and no abrasion were observed)
    Temperature increase around the device: Minimal As mentioned above, it could be experimentally verified that approximately perfect seal tightness could be achieved, even under high liquid pressure and high rotation speed, by the mechanical sealing device according to the present embodiment having a configuration that could be accommodated in an extremely small space with a level of 17 mm in the axial direction and a level of φ24 mm in the radial direction. Although cooling water is often required to be supplied for controlling the heat generated at the sliding surface, the experiment proved that such a cooling method was not necessary. As mentioned above, the mechanical sealing device according to the present embodiment has few parts and a simple configuration, and thus achieves a small size, while achieving high seal tightness and durability.

The aforementioned embodiment is an example of the present invention. It is apparent that any modification, correction, or addition along the scope of the present invention is included in the scope of claims of the present application.

REFERENCE SIGNS LIST

1 . . . Fixed Part
11 . . . Housing
11a . . . Protrusion
11b . . . Engaging Pin
12 . . . Fixed-side Passage
12a, 22a . . . Opening
13 . . . Sealing Ring
13a, 23a . . . Engaging Groove
13b . . . Seal Lip
14, 24 . . . O-Ring
15 . . . Welded Bellows
2 . . . Rotation Part
21 . . . Rotary Shaft
21a . . . Engaging Pin
22 . . . Rotation-side Passage
23 . . . Mating Ring
30 . . . Sliding Surface
C . . . Axis

The invention claimed is:

1. A mechanical sealing device provided between a housing and a rotary shaft for preventing a liquid from leaking out from a connection portion of a first passage and a second passage when a liquid is supplied from the first passage to the second passage or in the reverse direction, wherein the housing has a protrusion protruding in a substantially columnar shape, and the first passage is formed inside the protrusion in an axial direction of the protrusion, and wherein the second passage is formed inside the rotary shaft to extend in the axial direction along which the first passage extends, the mechanical sealing device comprising:

a) a fixed-side annular portion unrotatably and slidably in the axial direction attached to the housing, the fixed-side annular portion being sealed to the protrusion of the housing with an O-ring;

b) a rotation-side annular portion attached to the rotary shaft so as to be integrally rotatable with the rotary shaft, the rotation-side annular portion being sealed to the rotary shaft with a rotation-side sealing member; and c) a bellows provided around the protrusion so as to be positioned between the housing and the fixed-side annular portion, for pressing the fixed-side annular portion toward the rotation-side annular portion to cause the fixed-side annular portion to be in contact with the rotation-side annular portion, wherein the O-ring is disposed between a contact portion of the bellows with the housing and the connection portion and seals a gap between the fixed-side annular portion and the protrusion into which the liquid leaking out from the connection portion flows.

2. The mechanical sealing device according to claim 1, wherein the bellows is a welded-type bellows.

* * * * *